(12) United States Patent
Kajak

(10) Patent No.: US 11,100,522 B2
(45) Date of Patent: Aug. 24, 2021

(54) AIRCRAFT MOTION ASSESSMENT SYSTEMS AND METHODS

(71) Applicant: THE BOEING COMPANY, Chicago, IL (US)

(72) Inventor: Pawel Kajak, Gdansk (PL)

(73) Assignee: THE BOEING COMPANY, Chicago, IL (US)

( * ) Notice: Subject to any disclaimer, the term of this patent is extended or adjusted under 35 U.S.C. 154(b) by 1079 days.

(21) Appl. No.: 15/259,123

(22) Filed: Sep. 8, 2016

(65) Prior Publication Data
US 2018/0068332 A1 Mar. 8, 2018

(51) Int. Cl.
| | | |
|---|---|---|
| G06Q 10/00 | (2012.01) | |
| G06Q 30/02 | (2012.01) | |
| B64D 11/00 | (2006.01) | |
| B64F 5/60 | (2017.01) | |
| B64D 45/00 | (2006.01) | |
| G01H 1/00 | (2006.01) | |

(52) U.S. Cl.
CPC ..... G06Q 30/0203 (2013.01); B64D 11/0015 (2013.01); B64F 5/60 (2017.01); B64D 2045/0085 (2013.01); G01H 1/00 (2013.01)

(58) Field of Classification Search
USPC ...................................................... 705/7.32
See application file for complete search history.

(56) References Cited

U.S. PATENT DOCUMENTS

| | | |
|---|---|---|
| 6,772,104 B1 | 8/2004 | White |
| 2007/0162197 A1* | 7/2007 | Fleming ............... G08G 5/0013 701/10 |
| 2007/0229268 A1* | 10/2007 | Swan .................... G08B 21/24 340/572.1 |
| 2010/0145765 A1* | 6/2010 | Kantarek .............. G06Q 30/02 705/7.32 |
| 2014/0176296 A1* | 6/2014 | Morgan .................. G06F 3/011 340/4.13 |
| 2016/0133137 A1 | 5/2016 | Rencher |

FOREIGN PATENT DOCUMENTS

| | | |
|---|---|---|
| WO | WO 2013/187985 | 12/2013 |
| WO | WO 2016/060561 | 4/2016 |

OTHER PUBLICATIONS

Roychoudhury, I., Spirkovska, L., Daigle, M., Balaban, E., Sankararaman, S., Kulkarni, C., . . . & Goebel, K. (2015). Real-time monitoring and prediction of airspace safety. Ames Research Center. (Year: 2015).*

Extended European search report for EP 17181718.2-1754, dated Nov. 16, 2017.

* cited by examiner

*Primary Examiner* — Rutao Wu
*Assistant Examiner* — Matheus Ribeiro Stivaletti
(74) *Attorney, Agent, or Firm* — The Small Patent Law Group LLC; Joseph M. Butscher

(57) ABSTRACT

An aircraft motion assessment system and method includes associating a plurality of polling devices within an internal cabin of an aircraft with passenger seats onboard the aircraft, communicatively coupling a motion assessment control unit to the plurality of polling devices, and receiving, by the motion assessment control unit, passenger-input motion effects data from the plurality of polling devices.

27 Claims, 5 Drawing Sheets

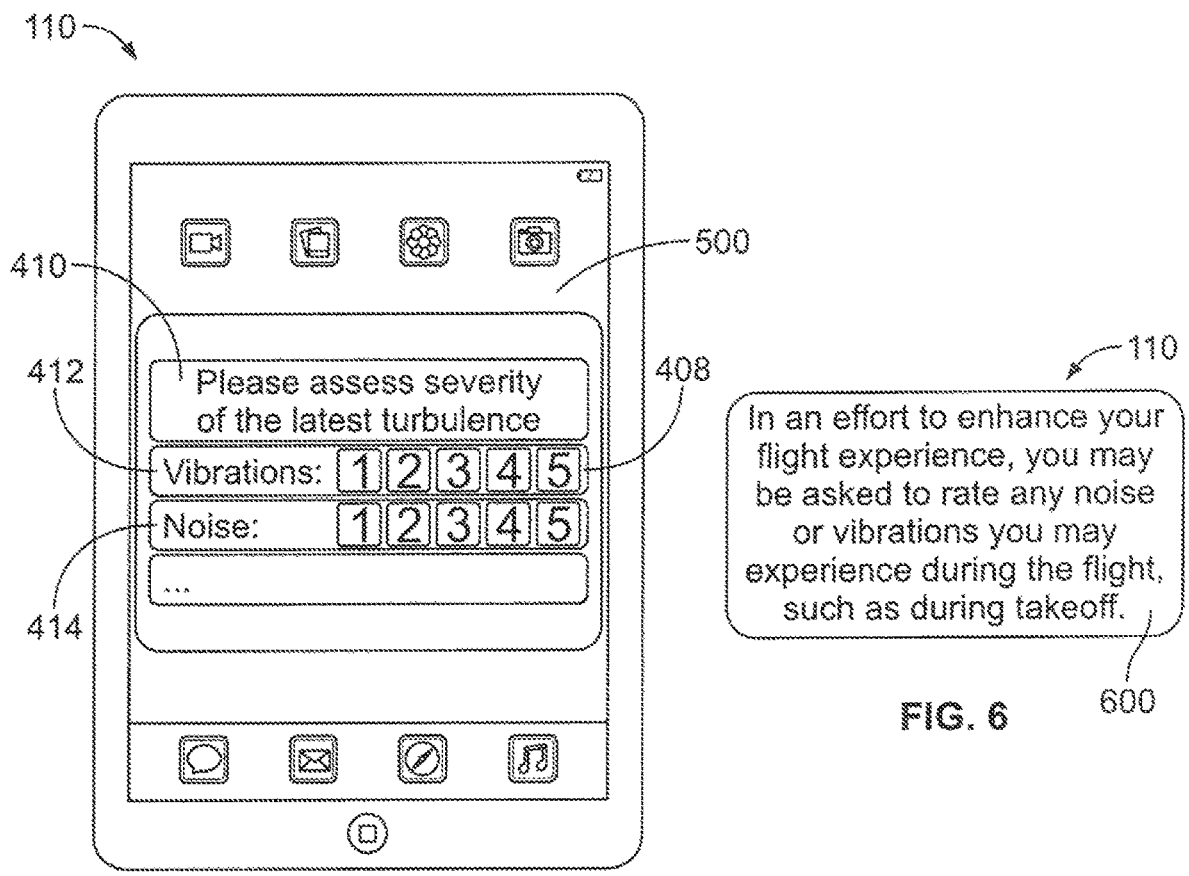
FIG. 5
FIG. 6
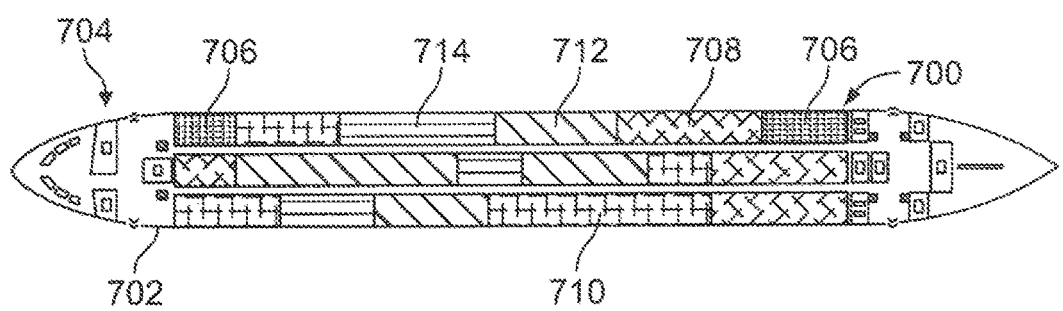
FIG. 7

AIRCRAFT MOTION ASSESSMENT SYSTEMS AND METHODS

FIELD OF THE DISCLOSURE

Embodiments of the present disclosure generally relate to systems and methods for assessing motion of an aircraft during a flight, and, more particularly, to systems and methods for assessing the effects of motion during a flight, such as experienced during takeoff, landing, and periods of air turbulence.

BACKGROUND OF THE DISCLOSURE

Commercial aircraft are used to transport passengers between various locations. As an aircraft takes off and lands, portions of an internal cabin may vibrate and generate noise, such as due to the motion of the aircraft as traveling along a runway. Further, when the aircraft is in the air, the portions of the internal cabin may vibrate and generate noise when the aircraft is subjected to air turbulence.

Typically, motion of the aircraft during takeoff, landing, and periods of air turbulence (such as vertical motion or lateral shifting) is detected through the use of onboard motion sensors, such as accelerometers. For example, one or more accelerometers onboard the aircraft sense a rate of change of altitude as the aircraft experiences air turbulence.

Passengers onboard the aircraft experience the effects of the aircraft motion. For example, motion of the aircraft may cause portions of an internal cabin to vibrate or generate noise. The passengers may feel the vibrations and hear the generated noise.

However, passengers within different portions of an aircraft often experience the effects of air turbulence, for example, differently than passengers within other portions of the aircraft. As an example, the effects of air turbulence (for example, vibrations and noise generated within the internal cabin) at a fore portion of the aircraft may be less pronounced than at an aft portion of the aircraft. Moreover, different passengers within the same portion of the aircraft (such as within the same row of seats) may experience the effects of air turbulence differently than other passengers, as certain passengers may have a greater or lesser tolerance for motion within an aircraft.

During or after periods of air turbulence, certain passengers may voice their concerns about the effects of the air turbulence to flight personnel. However, various other passengers may choose not to tell others how they felt during the periods of air turbulence. Yet passenger opinions of the effects of air turbulence onboard an aircraft may provide valuable information for passenger satisfaction, aircraft maintenance, future aircraft development, and/or the like.

SUMMARY OF THE DISCLOSURE

A need exists for a system and method for efficiently determining passenger assessments of motion onboard an aircraft. A need exists for a system and method for assessing motion information within different areas of an internal cabin of an aircraft.

With those needs in mind, certain embodiments of the present disclosure provide an aircraft motion assessment system that includes a plurality of polling devices within an internal cabin an aircraft. The plurality of polling devices are associated with passenger seats onboard the aircraft. A motion assessment control unit is communicatively coupled to the plurality of polling devices. The motion assessment control unit is configured to receive passenger-input motion effects data from the plurality of polling devices.

In at least one embodiment, the motion assessment control unit is configured to output a motion effects polling signal to the plurality of polling devices. The plurality of polling devices are configured to display a motion effects poll for passengers based on the motion effects polling signal. In at least one embodiment. The motion assessment control unit may be configured to output a subsequent motion effects polling signal to assess measures taken to reduce a previous instance of motion of the aircraft.

At least one motion sensor onboard the aircraft may be in communication with the motion assessment control unit. The motion assessment control unit may output the motion effects polling signal in response to at least one motion signal received from the at least one motion sensor. The motion assessment control unit may compare the motion signal(s) and passenger-input motion effects data received from the plurality of polling devices.

The motion assessment control unit may be configured to generate a motion map of the internal cabin based, at least in part, on passenger-input motion effects data received from the plurality of polling devices. The motion assessment control map may be configured to identify seats on the motion map that are susceptible to increased motion effects.

A poll triggering device may be configured to be engaged to cause the motion assessment control unit to output the motion effects polling signal to the plurality of polling devices. In at least one embodiment, one or more of the plurality of poll triggering devices is configured to be engaged to cause the motion assessment control unit to output the motion effects polling signal to the plurality of polling devices.

At least one of the plurality of polling devices may include a screen mounted to a passenger seat. At least one of the plurality of polling devices may be a handheld device of a passenger.

The motion effects poll may include one or both of a vibrations rating or a noise rating.

The motion assessment control unit may be configured to output a polling awareness signal to the plurality of polling devices. The plurality of polling devices may be configured to display a polling awareness message based on the motion polling awareness signal. The polling awareness message provides guidance as to the motions effects poll.

Certain embodiments of the present disclosure provide an aircraft motion assessment method that includes associating a plurality of polling devices within an internal cabin of an aircraft with passenger seats onboard the aircraft, communicatively coupling a motion assessment control unit to the plurality of polling devices, and receiving, by the motion assessment control unit, passenger-input motion effects data from the plurality of polling devices. The method may also include outputting a motion effects polling signal from the motion assessment control unit to the plurality of polling devices, and displaying on the plurality of polling devices a motion effects poll for passengers based on the motion effects polling signal.

Certain embodiments of the present disclosure provide an aircraft that includes a fuselage defining an internal cabin, a plurality of passenger seats within the internal cabin, and an aircraft motion assessment system.

BRIEF DESCRIPTION OF THE DRAWINGS

FIG. 5 is a diagrammatic representation of a front view of a polling device onboard an aircraft, according to an embodiment of the present disclosure.

FIG. 6 is a diagrammatic representation of a front view of a polling device showing a polling awareness message, according to an embodiment of the present disclosure.

FIG. 7 is a diagrammatic representation of a motion map of an internal cabin of an aircraft based on passenger-input motion effects data, according to an embodiment of the present disclosure.

DETAILED DESCRIPTION OF THE DISCLOSURE

Figure 1:
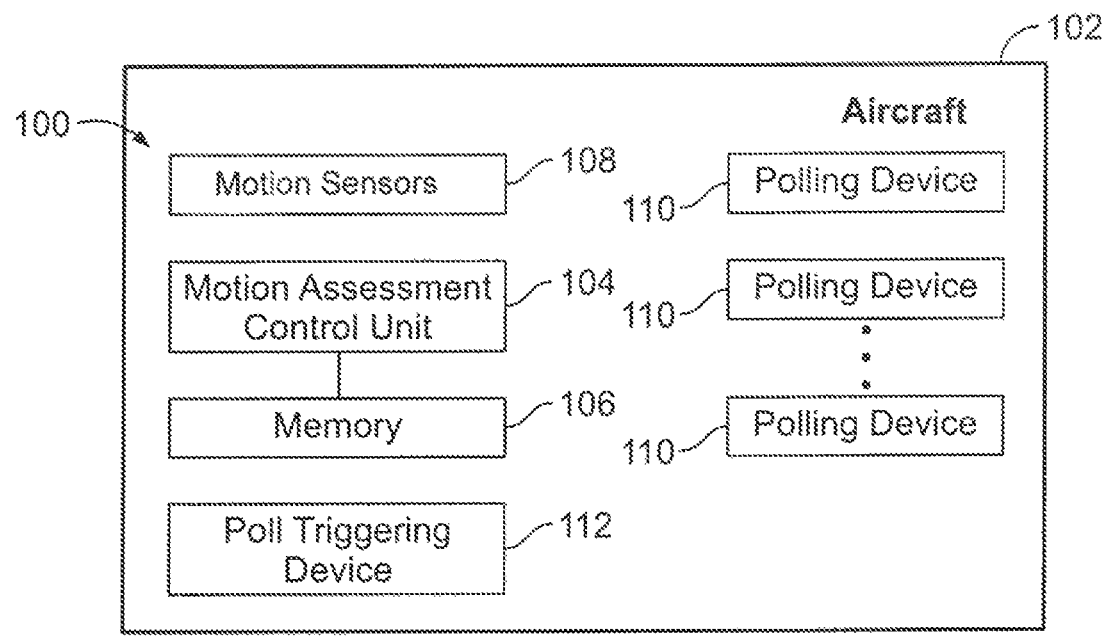
FIG. 1 is a schematic representation of an aircraft motion assessment system onboard an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide an aircraft motion assessment system and method that allow aircraft crew and manufacturers to assess motion (such as turbulence severity) as experienced by passengers onboard the aircraft. In this manner, embodiments of the present disclosure provide systems and methods for assessing turbulence onboard an aircraft. During a flight, the system polls passengers (such as through mobile devices, displays on passenger seats, and/or the like) in order to collect data regarding subjective experiences of motion within an internal cabin of the aircraft. In at least one embodiment, the aircraft motion assessment system and method compare objective measures of aircraft motion (such as motion signals output by accelerometers onboard an aircraft) with subjective passenger data regarding the aircraft motion. Passenger motion experience data collected from passenger inputs regarding, for example, vibration and noise within the aircraft may be consulted when developing future aircraft. For example, at locations of the aircraft (and/or a plurality of aircraft, such as a fleet of aircraft) in which passengers indicate increased levels of vibration or noise during takeoff, landing, periods of air turbulence, and/or the like, future aircraft may be developed with vibration dampers, for example, at particular areas of internal panels.

Certain embodiments of the present disclosure also provide systems and methods that may be used to compare how different aircraft types respond to motion of similar magnitude, which may lead to potential savings by re-using existing solutions in newly-developed airplanes. By combining objective levels of motion onboard an aircraft (such as detected through one more onboard motion sensors) and subjective passenger data of experienced motion, aircraft operators are able to provide improved customer service. For example, passengers with increased sensitivities to motion may be directed to areas within an internal cabin that tend to experience less vibrations and noise during periods of air turbulence, based on prior passenger feedback.

Certain embodiments of the present disclosure provide an aircraft motion assessment system that is configured to collect subjective passenger information regarding effects of turbulence, and correlate the passenger information with current turbulence measurements and forecasts. In at least one embodiment, passenger reports of turbulence may be reported to aircraft crew if a certain threshold is exceeded. Passengers may be polled (for example, questioned) about aircraft motion, such as during periods of turbulence. Passenger feedback may be used to identify areas of the aircraft that are sensitive to turbulence.

FIG. 1 is a schematic representation of an aircraft motion assessment system 100 onboard an aircraft 102, according to an embodiment of the present disclosure. The aircraft motion assessment system 100 includes a motion assessment control unit 104 coupled to a memory 106, such as through one or more wired or wireless connections. As shown, the motion assessment control unit 104 and the memory 106 are onboard the aircraft 102. In at least one other embodiment, the motion assessment control unit 104 and the memory 106 may be remotely located from the aircraft 102 (such as at a land based monitoring station), and in communication with the aircraft 102 through one more communication devices, such as radio units, transceivers, and/or the like. In at least one other embodiment, the motion assessment control unit 104 may be onboard the aircraft 102, while the memory 106 is remotely located from the aircraft 102.

The aircraft 102 includes one or more motion sensors 108 that are configured to detect motion of the aircraft 102. For example, the motion sensors 108 may include accelerometers that are configured to objectively detect motion of the aircraft 102, such as during periods of air turbulence. The motion sensors 108 may be communicatively coupled to the motion assessment control unit 104, such as through one or more wired or wireless connections. The motion sensors 108 output motion signals (such as may be indicative of air turbulence) that are received by the motion assessment control unit 104. The motion signals output by the motion sensors 108 provide objective motion data in the form of the motion signals, which are actual sensor outputs, as opposed to subjective human opinion. Alternatively, the motion assessment control unit 104 is not communicatively coupled to the motion sensors 108. For example, the motion assessment control unit 104 may be in communication with an onboard flight computer of the aircraft 102, which is, in turn, communicatively coupled to the motion sensors 108. In at least one other embodiment, objective data regarding air turbulence may be received from a weather service, an atmospheric service, and/or the like.

The motion assessment control unit 104 is also in communication with a plurality of passenger polling devices 110 onboard the aircraft 102. In at least one embodiment, the polling devices 110 are mounted on passenger seats, such as in-flight entertainment systems having display screens mounted to rear surfaces of seat headrests. In at least one other embodiment, the polling devices 110 may be passenger mobile devices having display screens. For example, during a flight, the motion assessment control unit 104 may be in communication with a handheld mobile phone or smart device of a passenger, such as through one or more wired or wireless (for example, WiFi) connections. In at least one embodiment, the polling devices 110 include monitors mounted to portions of the aircraft within an internal cabin (such as in-flight entertainment systems) and passenger mobile devices. Each of the polling devices 110 may include one or more motion sensors.

The aircraft motion assessment system 100 may also include a poll triggering device 112, which may be communicatively coupled to the motion assessment control unit 104 and/or the polling devices 110. The poll triggering device 112 may be a computer, workstation, touchscreen, handheld computing device (such as a smart phone), and/or the like onboard the aircraft 102 that is configured to be engaged by personnel onboard the aircraft, such as a pilot, flight attendant, or other such flight crew to output a motion effects poll signal to the polling devices 110. Alternatively, the aircraft motion assessment system 100 may not include the poll triggering device.

In operation, during a flight, the motion assessment control unit 104 outputs a motion effects poll signal to the polling devices 110. In at least one embodiment, when the motion sensors 108 detect air turbulence (such as through output motion signals), the motion assessment control unit 104 receives the motion signals from the motion sensors 108. Air turbulence may be determined when received motion signals from the motion sensors 108 exceed a predetermined turbulence threshold. When the motion assessment control unit 104 detects air turbulence, the motion assessment control unit 104 outputs the motion effects poll signal to the polling devices 110. That is, in response to receiving the motion signals from the motion sensor(s) 108 (such as when the motion signals exceed a predetermined turbulence threshold), the motion assessment control unit 104 may output the motion effects poll signal to the polling devices 110.

Upon receiving the motion effects poll signal from the motion assessment control unit 104, the polling devices 110 display a motion effects poll, which prompts passengers at the locations of and/or proximate to the polling device 110 to input their opinions regarding the motion of the aircraft. In at least one embodiment, the motion effects poll may query passengers regarding levels of vibration and/or noise within the aircraft.

As described, the motion effects poll may be displayed on the polling devices 110 based on motion detected by the motion sensors 108. That is, the motion effects poll may be automatically displayed on the polling devices 110 in response to a particular level of motion detected by the motion sensors 108.

The motion effects poll provides severity options for one or more motion effects within the aircraft. For example, the motion effects poll may query the passenger to rate a level of vibration and/or a level of noise on a scale of 1 to 5, with 1 being a low level and 5 being a high level. As another example, the motion effects poll may query the passenger to rate severity levels based on a color spectrum, such as a green color indicates a low level and red indicates a high level. As another example, the motion effects poll may be a scale, dial, slider bar, and/or the like that ranges from low to high.

In at least one embodiment, the poll triggering device 112 may be used to output the motion effects poll signal to the polling device 110. For example, flight crew may engage the poll triggering device 112 such as through one more input devices (for example, a touchscreen, a button, a mouse, a keyboard, and/or the like) to cause the motion assessment control unit 104 to output the motion effects poll signal to the polling devices 110. In this manner, the motion effects poll may be shown on the polling devices 110 based on a flight crew initiated command.

In at least one embodiment, passengers onboard the aircraft 102 may prompt one or more of the polling devices 110 to show the motion effects poll. For example, the polling devices 110 may include touchscreens, keypads, and/or the like that allow passengers to initiate the motion effects poll (such as by causing the motion assessment control unit 104 to output the motion effect poll signal). In this manner, the motion effects poll may be shown on the polling devices 110 based on a passenger initiated command.

The motion effects poll may be shown on the polling devices 110 during the motion of the aircraft 102 that is the subject of the motion effects poll (such as during takeoff, landing, or periods of air turbulence), and/or after such motion. During periods of aircraft motion, certain passengers may prefer not to engage the polling devices 110. As such, the passengers may engage the polling devices 110 after such motion.

The passengers input their opinions regarding the motion of the aircraft 102 via the motion effects poll shown on the polling devices 110. Passenger-input motion effects data (such as motion severity information) input through the polling devices 110 is received by the motion assessment control unit 104, which may store the data within the memory 106. The passenger-input motion effects data may be stored in the memory 106 and correlated with a time of the aircraft motion, passenger locations, and/or the like. Further, the motion assessment control unit 104 may correlate the passenger-input motion effects data with objective data regarding the motion of the aircraft 102, such as detected by the motion sensors 108.

The motion assessment control unit 104 may aggregate the passenger-input motion effects data and determine levels of motion within the aircraft 102 based on the received passenger-input motion effects data. For example, through the received passenger-input motion effects data input through the polling devices 110, the motion assessment control unit 104 may determine the effects of motion at various portions of the aircraft 102. The motion assessment control unit 104 may store such data within the memory 106. The data may be analyzed to determine areas of the aircraft 102 that may be flagged for maintenance inspection (for example, one or more wall panels may be inspected or supplemented with vibration dampers). In at least one other embodiment, the motion effects data may be compared with similar data from other aircraft, which may be used for future aircraft development.

Because different individuals experience motion differently than others, the motion assessment control unit 104 may average collected passenger-input motion effects data from similar areas of the aircraft 102. In at least one embodiment, the motion assessment control unit 104 may disregard statistical outliers (high or low) from similar areas of the aircraft 102.

As described above, the aircraft motion assessment system 100 may compare objective data regarding aircraft motion, such as received from the motion sensors 108), with subjective passenger-input motion effects data that is input through the polling device 110. The passenger-input motion effects data provides subjective passenger opinion regarding the effects of motion of the aircraft, and provides valuable feedback from actual passengers onboard the aircraft during a flight.

In at least one other embodiment, one or more of the polling devices 110 may include one or more motion sensors, such as accelerometers. For example, one or more of the polling devices 110 may be handheld smart devices (such as smart phones) that include an accelerometer. When the passengers input passenger-input motion effects data, the polling devices 110 may also output objective motion data, as detected by the motion sensors, to the motion assessment control unit 104. In this manner, the motion assessment control unit 104 may analyze subjective motion data from the passengers, such as the passenger-input motion effects data, objective motion data from the motion sensors 108 onboard the aircraft, and objective motion data from the motion sensors of the polling devices 110.

As shown, a plurality of polling devices 110 may be onboard the aircraft 102. Each passenger onboard the aircraft 102 may be assigned a polling device 110, such as via their seat assignment. In this manner, each polling device 110 may be associated with a respective passenger seat. Optionally, not all of the passenger seats onboard the aircraft 102 may be associated with a polling device 110.

The motion assessment control unit 104 may periodically output the motion polling signal to the polling devices 110, whether or not the aircraft 102 is experiencing air turbulence. For example, the motion assessment control unit 104 may output the motion polling signal during takeoff, landing, ascent, descent, certain times during cruising, and/or the like, in order to analyze motion effects of the aircraft at various times.

Before a flight (such as when the aircraft 102 is parked at a gate) or during a flight, the motion assessment control unit 104 may output a polling awareness signal to the polling devices, which may display a polling awareness message (such as a graphic, text, video, and/or audio message). The polling awareness message provides guidance (for example instructions on how to interact with the polling devices 110) for passengers to consider during a flight, factors to be aware of during the flight, topics for polling, and the like. For example, the polling awareness message may recite "In an effort to enhance your flight experience, you may be asked to rate any noise or vibrations you experience during the flight." The polling awareness message may then display a sample motion effects poll on the polling device 110, and/or instructions for inputting passenger-input motion effects data.

In at least one embodiment, the motion assessment control unit 104 may output subsequent polls to the polling devices 110 after the aircraft 102 flies into an area of reduced or no turbulence. For example, the aircraft 102 may have previously flown through an area of increased turbulence, at which point passengers rated the effects of the turbulence through the polling devices 110, as described above. The aircraft 102 may subsequently fly through an area of reduced or no turbulence, at which point the passengers are polled again regarding any motion effects. A pilot may fly the aircraft 102 through areas of reduced turbulence, at which point customer feedback is used to rate the measures taken to alleviate the effects of prior turbulence. In short, initial and subsequent polling may be used to rate measures to alleviate or otherwise reduce the effects of turbulence.

Additionally, data collected regarding passenger experiences and airplane maps may be used to improve future customer experiences. For example, such data may be used to determine particularly noisy areas of an aircraft. Also, a turbulence or motion map specific to a particular aircraft may be used to determine if one particular aircraft is particularly noisy as compared to others of the same type and/or within the same fleet. Such information may be used to identify particular aircraft for the purposes of maintenance. Also, the turbulence or motion map information may be used to suggest preferred available seats for a passengers that may be sensitive to turbulence.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the motion assessment control unit 104 may be or include one or more processors that are configured to control operation of aircraft motion assessment system 100, as described above.

The motion assessment control unit 104 is configured to execute a set of instructions that are stored in one or more data storage units or elements (such as one or more memories), in order to process data. For example, the motion assessment control unit 104 may include or be coupled to one or more memories, such as the memory 106. The data storage units may also store data or other information as desired or needed. The data storage units may be in the form of an information source or a physical memory element within a processing machine.

The set of instructions may include various commands that instruct the motion assessment control unit 104 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the motion assessment control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the motion assessment control unit 104 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
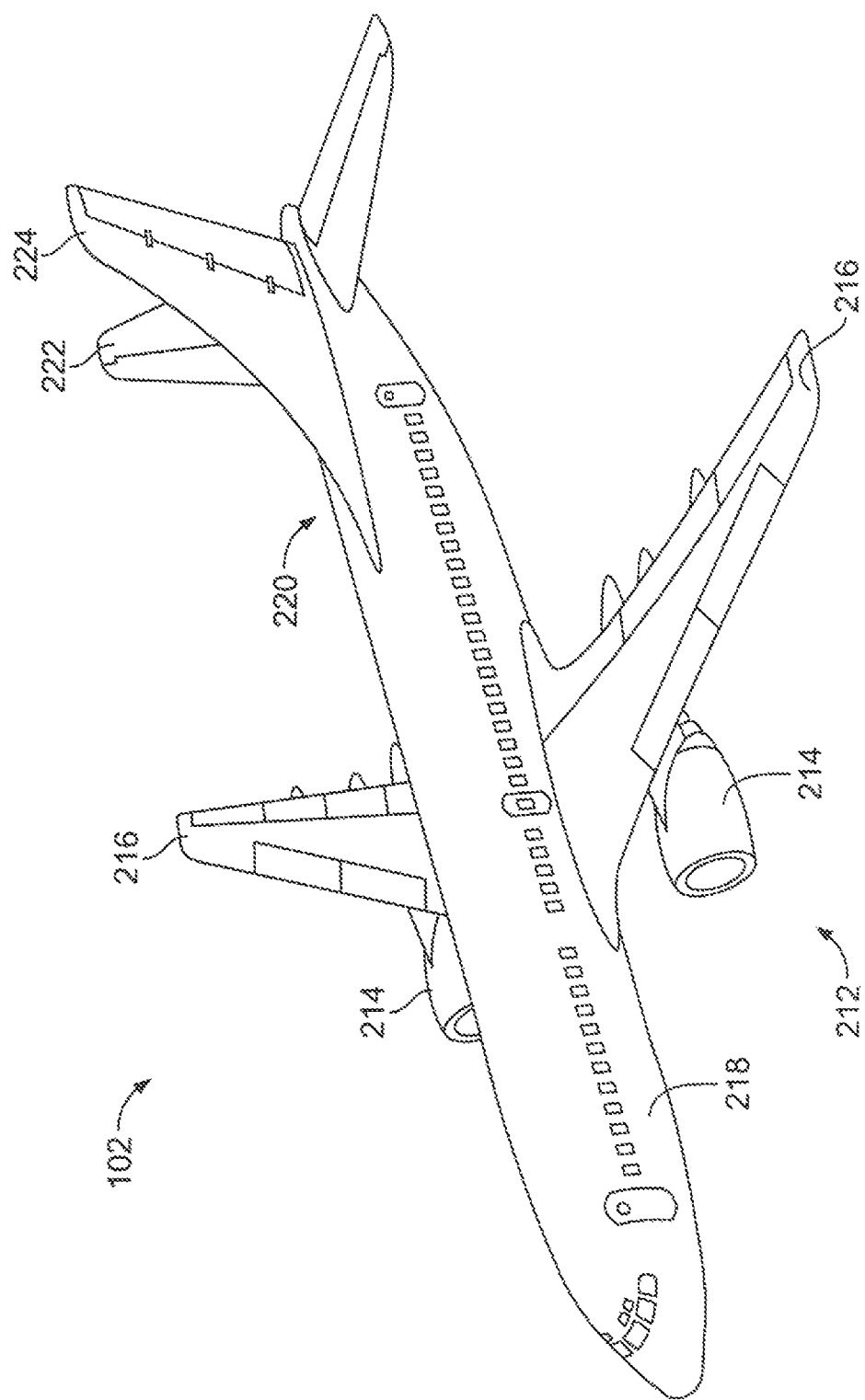
FIG. 2 is a diagrammatic representation of a top perspective view of an aircraft, according to an embodiment of the present disclosure.

FIG. 2 illustrates a top perspective view of the aircraft 102, according to an embodiment of the present disclosure. The aircraft 102 includes an aircraft motion assessment system 100, as described above with respect to FIG. 1. The aircraft 102 includes a propulsion system 212 that may include two turbofan engines 214, for example. Optionally, the propulsion system 212 may include more engines 214 than shown. The engines 214 are carried by wings 216 of the aircraft 102. In other embodiments, the engines 214 may be carried by a fuselage 218 and/or an empennage 220. The empennage 220 may also support horizontal stabilizers 222 and a vertical stabilizer 224.

The fuselage 218 of the aircraft 102 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

Each of the passenger seats within the internal cabin may be associated with a respective polling device 110 (shown in FIG. 1). For example, a polling device 110 may be mounted proximate to each passenger seat, such as in front of each passenger seat (for example, mounted to a rear surface of a head rest of an immediately forward passenger seat), and/or on the person of a passenger within the passenger seat (for example, a mobile device of the passenger).

Figure 3A:
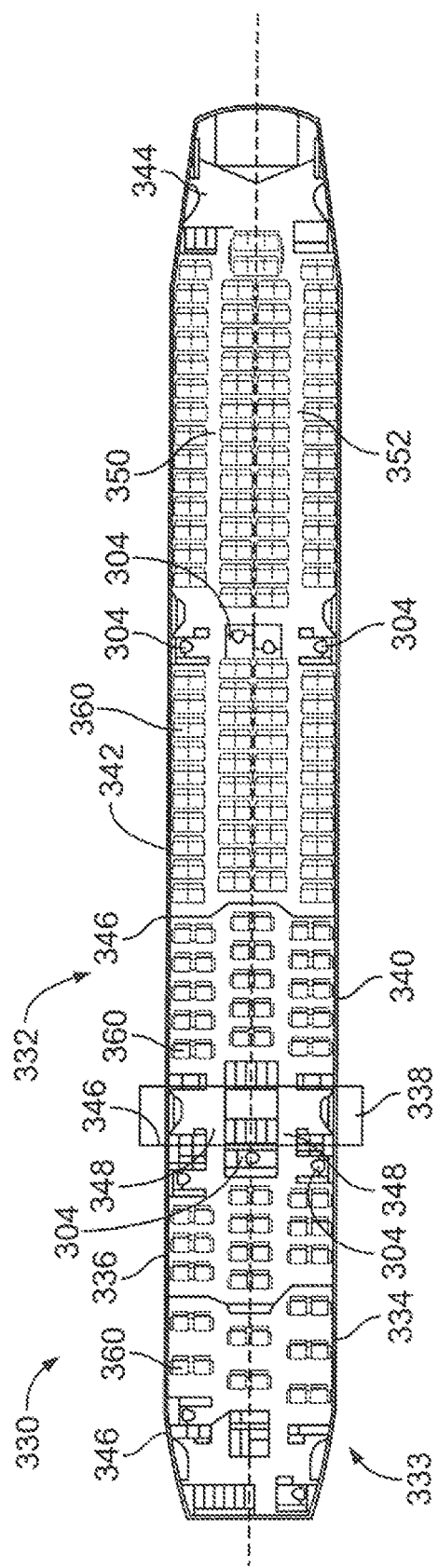
FIG. 3A is a diagrammatic representation of a top plan view of an internal cabin of an aircraft, according to an embodiment of the present disclosure.

FIG. 3A illustrates a top plan view of an internal cabin 330 of an aircraft, according to an embodiment of the present disclosure. The internal cabin 330 may be within a fuselage 332 of the aircraft. For example, one or more fuselage walls may define the internal cabin 330. The internal cabin 330 includes multiple sections, including a front section 333, a first class section 334 (or first class suites, cabins, for example), a business class section 336, a front galley station 338, an expanded economy or coach section 340, a standard economy or coach section 342, and an aft section 344, which may include multiple chambers 304, such as lavatories and galley stations. Passenger seats 360 are secured within the internal cabin 330. Polling devices 110 (shown in FIG. 1) are associated with a plurality of the passenger seats 360. For example, each passenger seat 360 within the internal cabin 330 may be associated with a polling device 110. It is to be understood that the internal cabin 330 may include more or less sections than shown. For example, the internal cabin 330 may not include a first class section, and may include more or less galley stations than shown. Each of the sections may be separated by a cabin transition area 346, which may include class divider assemblies between aisles 348, 350, and/or 352.

As shown in FIG. 3A, the internal cabin 330 includes two aisles 350 and 352 that lead to the aft section 344. Optionally, the internal cabin 330 may have less or more aisles than shown. For example, the internal cabin 330 may include a single aisle that extends through the center of the internal cabin 330 that leads to the aft section 344 (see, for example, FIG. 3B).

Figure 3B:
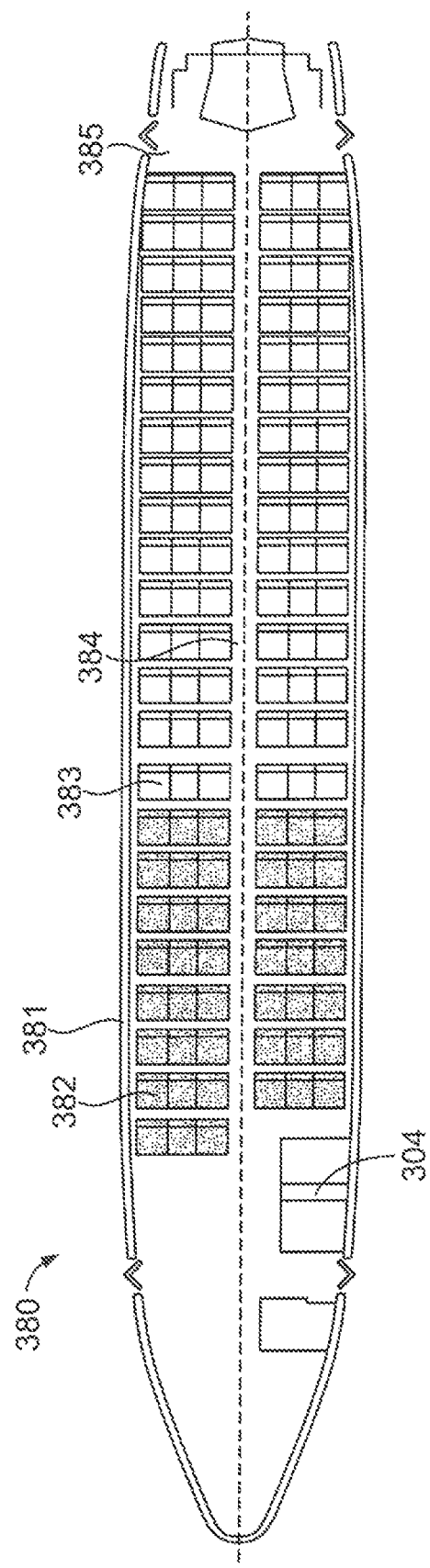
FIG. 3B is a diagrammatic representation of a top plan view of an internal cabin of an aircraft, according to an embodiment of the present disclosure.

FIG. 3B illustrates a top plan view of an internal cabin 380 of an aircraft, according to an embodiment of the present disclosure. The internal cabin 380 may be within a fuselage 381 of the aircraft. For example, one or more fuselage walls may define the internal cabin 380. The internal cabin 380 includes multiple sections, including a main cabin 382 having passenger seats 383, and an aft section 385 behind the main cabin 382. It is to be understood that the internal cabin 380 may include more or less sections than shown.

The internal cabin 380 may include a single aisle 384 that leads to the aft section 385. The single aisle 384 may extend through the center of the internal cabin 380 that leads to the aft section 385. For example, the single aisle 384 may be coaxially aligned with a central longitudinal plane of the internal cabin 380.

Polling devices 110 (shown in FIG. 1) are associated with a plurality of the passenger seats 383. For example, each passenger seat 383 within the internal cabin 380 may be associated with a respective polling device 110.

Figure 4:
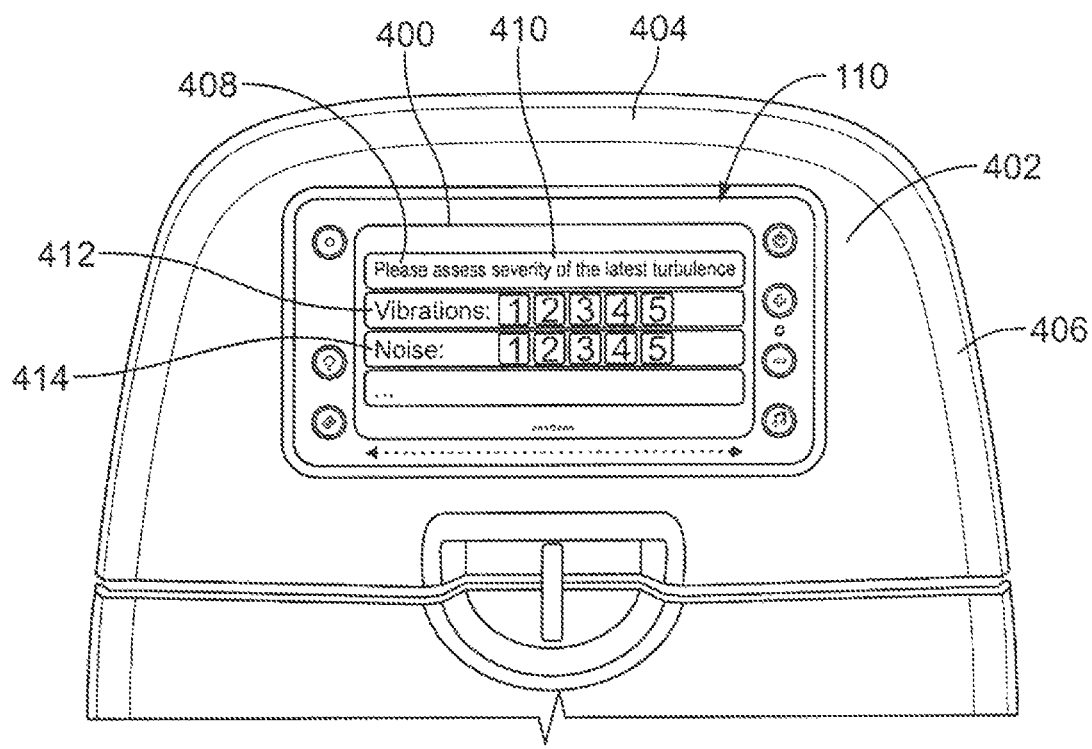
FIG. 4 is a diagrammatic representation of a front view of a polling device onboard an aircraft, according to an embodiment of the present disclosure.

FIG. 4 is a diagrammatic representation of a front view of a polling device 110 onboard an aircraft, according to an embodiment of the present disclosure. The polling device 110 may include a screen 400 (such as a touchscreen monitor, display, or the like) of an in-flight entertainment system onboard the aircraft. As shown, the video screen 400 may be mounted to a rear surface 402 of a headrest 404 an immediately-forward passenger seat 406 in front of a passenger seat (not shown in FIG. 4) associated with the polling device 110. In at least one other embodiment, the polling device 110 may be mounted to other portions of the immediately-forward passenger seat 406, the passenger seat (not shown), a divider wall within the aircraft, and/or the like.

The polling device 110 shown in FIG. 4 is displaying a motion effects poll 408 on the screen 400. The motion effects poll 408 includes a query message 410, such as "please assess the severity of the latest turbulence," a vibrations rating 412, and a noise rating 414. The ratings 412 and 414 may be virtual scales, dials, sliders, or the like. Each rating 412 and 414 may include numerical ranges and/or color coding that allow a passenger to input passenger-input motion effects data through the polling device 110. In at least one embodiment, the input medium may be a touchscreen interface of the screen 400, and/or one or more buttons, keys, switches, of the polling device 110.

FIG. 5 is a diagrammatic representation of a front view of a polling device 110 onboard an aircraft, according to an embodiment of the present disclosure. The polling device 110 may be a handheld smart device, such as a smart phone, tablet, pad, or the like, assigned to or otherwise associated with a passenger. The polling device 110 includes a screen 500 (such as a touchscreen monitor, display, or the like) of the handheld smart device.

The polling device 110 shown in FIG. 5 is displaying the motion effects poll 408 on the screen 500. The motion effects poll 408 includes the query message 410, such as "please assess the severity of the latest turbulence," the vibrations rating 412, and the noise rating 414. The ratings 412 and 414 may include numerical ranges and/or color coding that allow a passenger to input passenger-input motion effects data through the polling device 110. In at least one embodiment, the input medium may be a touchscreen interface of the screen 400, and/or one or more buttons, keys, switches, of the polling device 110.

FIG. 6 is a diagrammatic representation of a front view of a polling device 110 (such as shown in FIG. 1, 4, or 5) showing a polling awareness message 600, according to an embodiment of the present disclosure. The polling awareness message 600 provides a passenger with an awareness of possible motion effects polling during the flight.

FIG. 7 is a diagrammatic representation of a motion map 700 (or turbulence map) of an internal cabin 702 of an aircraft 704 based on passenger-input motion effects data, according to an embodiment of the present disclosure. Referring to FIGS. 1 and 7, the motion assessment control unit 104 may generate the motion map 700 based on the received passenger-input motion effects data, and objective motion data received from motion sensors 108. The motion map 700 may include motion differential areas, such as areas of high motion 706, heightened motion 708, intermediate motion 710, lower motion 712, and/or low or no motion 714. The motion differential areas may be color coded or otherwise graphically distinguished (such as through shading, cross-hatching, numerical or alphabetical indicia, and/or the like). The motion map 700 may be used to determine potential areas for maintenance inspection, future aircraft development (for example, areas for increased insulation, dampening, or the like), preferred areas for passengers with increased sensitivity to motion, and/or the like. The motion map 700 may be generated for each flight of the aircraft 704. In at least one embodiment, the motion map 700 may be aggregated and/or updated after each flight to provide motion information for multiple flights.

Figure 8:
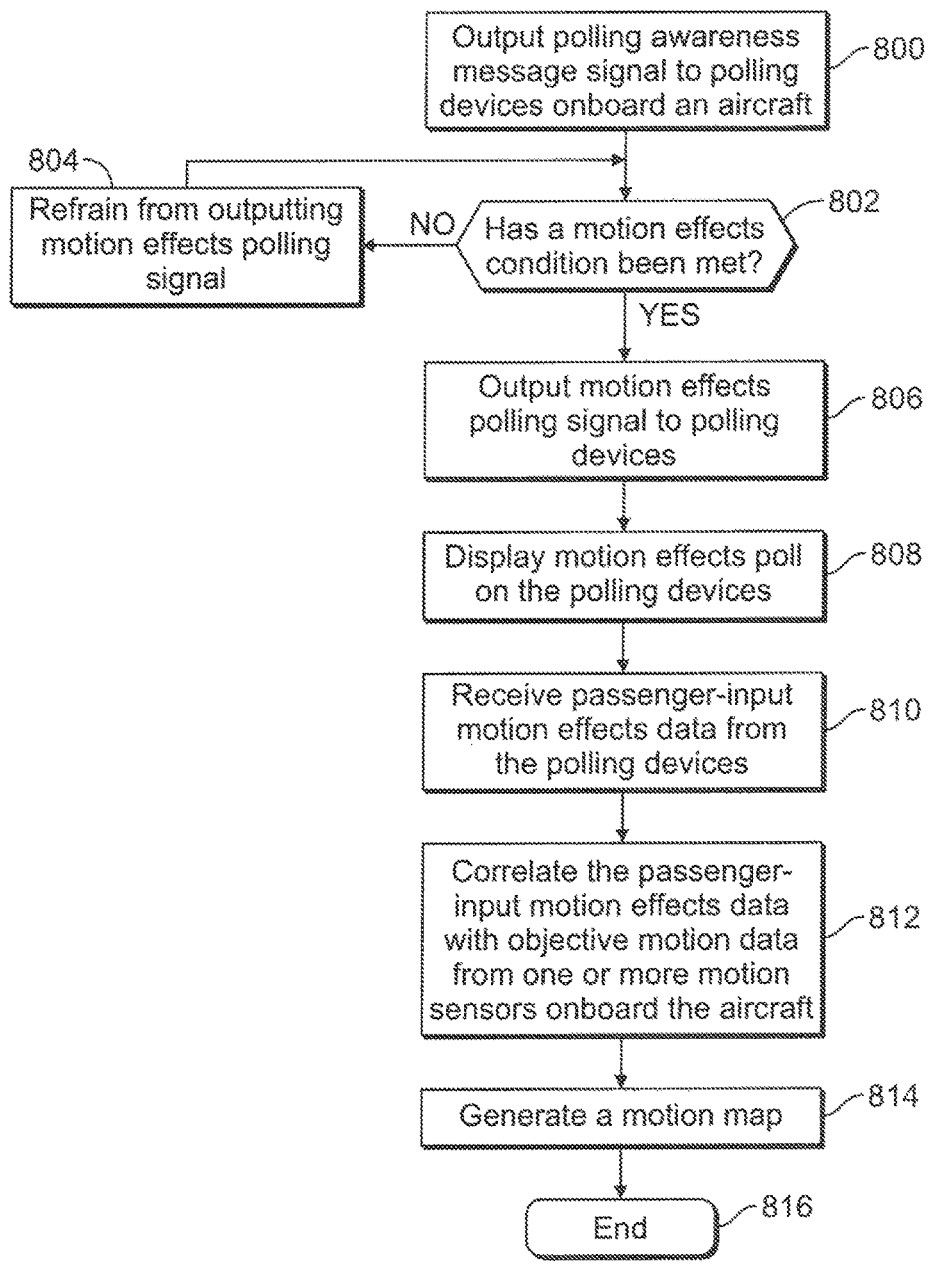
FIG. 8 illustrates a flow chart of a method of assessing motion onboard an aircraft, according to an embodiment of the present disclosure.

FIG. 8 illustrates a flow chart of a method of assessing motion onboard the aircraft 102, according to an embodiment of the present disclosure. Referring to FIGS. 1 and 8, the method begins at 800, at which the motion assessment control unit 104 outputs a polling awareness message signal to polling devices 110 onboard the aircraft 102. The polling devices 110 may display the polling awareness message. Optionally, the method may not include 800.

At 802, the motion assessment control unit 104 determines whether a motion effects condition has been met. The motion effects condition may be a predetermined level of air turbulence, as detected by motion signals output by the motion sensors 108 exceeding a predetermined turbulence threshold, an aircraft takeoff or landing signal as output by a flight computer (communicatively coupled to the motion assessment control unit 104), or output by a poll triggering device 112 engaged by a flight crew member, a passenger(s) engaging the polling device(s) 110, and/or the like. If the motion effects condition has not been met, the method proceeds to 804, at which the motion assessment control unit 104 refrains from outputting a motion effects polling signal.

If, however, the motion effects condition has been met at 802, the method proceeds to 806, at which the motion assessment control unit 104 outputs the motion effects polling signal to one or more of the polling devices 110. At 808, a motion effects poll (as determined by the motion effects polling signal) is displayed on one or more of the polling devices 110. Passengers at passenger seats associated with the polling devices 110 then input their assessments of the motion effects within the internal cabin of the aircraft 102.

At 810, the motion assessment control unit 104 receives passenger-input motion effects data from the polling devices 110. At 812, the motion assessment control unit 104 correlates the passenger-input motion effects data with objective motion data from one or more of the motion sensors 108 onboard the aircraft 102. Alternatively, the method may not include 812.

At 814, the motion assessment control unit 814 may generate and output a motion map, such as shown in FIG. 7. The method then ends at 816.

As described above, embodiments of the present disclosure provide systems and methods for efficiently determining passenger assessments of motion onboard an aircraft. Embodiments of the present disclosure provide systems and methods for assessing motion information within different areas of an internal cabin of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft motion assessment system comprising:
   a plurality of polling devices within an internal cabin of an aircraft, wherein the plurality of polling devices are associated with passenger seats onboard the aircraft; and
   a motion assessment control unit circuit communicatively coupled to the plurality of polling devices, wherein the motion assessment control unit circuit is configured to receive passenger-input motion effects data from the plurality of polling devices,
   wherein the motion assessment control unit circuit is configured to output a motion effects polling signal to the plurality of polling devices, and wherein the plurality of polling devices are configured to display a motion effects poll for passengers based on the motion effects polling signal.

2. The aircraft motion assessment system of claim 1, wherein the motion assessment control unit circuit is configured to output a subsequent motion effects polling signal to assess measures taken to reduce a previous instance of motion of the aircraft.

3. The aircraft motion assessment system of claim 1, further comprising at least one motion sensor onboard the aircraft and in communication with the motion assessment control unit circuit.

4. The aircraft motion assessment system of claim 3, wherein the motion assessment control unit circuit outputs a motion effects polling signal in response to at least one motion signal received from the at least one motion sensor.

5. The aircraft motion assessment system of claim 4, wherein the motion assessment control unit circuit compares the at least one motion signal and passenger-input motion effects data received from the plurality of polling devices.

6. The aircraft motion assessment system of claim 1, wherein the motion assessment control unit circuit is configured to generate a motion map of the internal cabin based, at least in part, on passenger-input motion effects data received from the plurality of polling devices.

7. The aircraft motion assessment system of claim 6, wherein the motion assessment control unit is configured to identify seats on the motion map that are susceptible to increased motion effects.

8. The aircraft motion assessment system of claim 1, further comprising a poll triggering device, wherein the poll triggering device is configured to be engaged to cause the motion assessment control unit circuit to output a motion effects polling signal to the plurality of polling devices.

9. The aircraft motion assessment system of claim 1, wherein the poll triggering device is configured to be engaged to cause the motion assessment control unit circuit to output a motion effects polling signal to the plurality of polling devices.

10. The aircraft motion assessment system of claim 1, wherein at least one of the plurality of polling devices includes a screen mounted to a passenger seat.

11. The aircraft motion assessment system of claim 1, wherein at least one of the plurality of polling devices is a handheld device of a passenger.

12. The aircraft motion assessment system of claim 1, wherein the motion effects poll comprises one or both of a vibrations rating or a noise rating.

13. The aircraft motion assessment system of claim 1, wherein the motion assessment control unit circuit is configured to output a polling awareness signal to the plurality of polling devices, wherein the plurality of polling devices are configured to display a polling awareness message based on the motion polling awareness signal, and wherein the polling awareness message provides guidance as to the motions effects poll.

14. An aircraft motion assessment method comprising:
    associating a plurality of polling devices within an internal cabin of an aircraft with passenger seats onboard the aircraft;
    communicatively coupling a motion assessment control unit circuit to the plurality of polling devices;
    receiving, by the motion assessment control unit circuit, passenger-input motion effects data from the plurality of polling devices;
    outputting a motion effects polling signal from the motion assessment control unit circuit to the plurality of polling devices; and
    displaying on the plurality of polling devices a motion effects poll for passengers based on the motion effects polling signal.

15. The aircraft motion assessment method of claim 14, further comprising:
    communicatively coupling at least one motion sensor onboard the aircraft to the motion assessment control unit circuit, wherein the outputting comprises outputting the motion effects polling signal in response to at least one motion signal received from the at least one motion sensor; and
    comparing, by the motion assessment control unit circuit, the at least one motion signal and passenger-input motion effects data received from the plurality of polling devices.

16. The aircraft motion assessment method of claim 14, further comprising generating, by the motion assessment control unit circuit, a motion map of the internal cabin based, at least in part, on the passenger-input motion effects data received from the plurality of polling devices.

17. The aircraft motion assessment method of claim 14, further comprising engaging a poll triggering device to cause the outputting.

18. The aircraft motion assessment system of claim 17, further comprising engaging the poll triggering device to cause the outputting.

19. The aircraft motion assessment method of claim 14, further comprising:
    outputting, by the motion assessment control unit circuit, a polling awareness signal to the plurality of polling devices; and
    displaying a polling awareness message based on the motion polling awareness signal on the plurality of polling devices, wherein the polling awareness message provides guidance as to the motions effects poll.

20. An aircraft comprising:
    a fuselage defining an internal cabin;
    a plurality of passenger seats within the internal cabin; and
    an aircraft motion assessment system comprising:
    a plurality of polling devices within the internal cabin, wherein the plurality of polling devices are associated with the passenger seats, wherein at least a first one of the plurality of polling devices includes a screen mounted to one of the plurality of passenger seats, and wherein at least a second one of the plurality of polling devices is a handheld device of a passenger;
    a motion assessment control unit circuit communicatively coupled to the plurality of polling devices, wherein the motion assessment control unit circuit is configured to output a polling awareness signal to the plurality of polling devices, wherein the plurality of polling devices are configured to display a polling awareness message based on the motion polling awareness signal, wherein the polling awareness message provides guidance as to a motions effects poll, wherein the motion assessment control unit circuit is further configured to output a motion effects polling signal to the plurality of polling devices, wherein the plurality of polling devices are configured to display the motion effects poll based on the motion effects polling signal, wherein the motion effects poll comprises one or both of a vibrations rating or a noise rating, wherein the motion assessment control unit circuit is configured to receive passenger-input motion effects data from the plurality of polling devices, and wherein the motion assessment control unit circuit is configured to generate a motion map of the internal cabin based, at least in part, on the passenger-input motion effects data received from the plurality of polling devices;

at least one motion sensor onboard the aircraft and in communication with the motion assessment control unit circuit, wherein the motion assessment control unit circuit is configured to output the motion effects polling signal in response to at least one motion signal received from the at least one motion sensor, wherein the motion assessment control unit circuit compares the at least one motion signal and passenger-input motion effects data received from the plurality of polling devices; and a poll triggering device configured to be engaged to cause the motion assessment control unit circuit to output the motion effects polling signal to the plurality of polling devices.

21. An aircraft motion assessment system comprising:
a plurality of polling devices within an internal cabin an aircraft, wherein the plurality of polling devices are associated with passenger seats onboard the aircraft;
a motion assessment control unit circuit communicatively coupled to the plurality of polling devices, wherein the motion assessment control unit circuit is configured to receive passenger-input motion effects data from the plurality of polling devices; and
at least one motion sensor onboard the aircraft and in communication with the motion assessment control unit circuit,
wherein the motion assessment control unit circuit outputs a motion effects polling signal in response to at least one motion signal received from the at least one motion sensor, and
wherein the motion assessment control unit circuit compares the at least one motion signal and passenger-input motion effects data received from the plurality of polling devices.

22. An aircraft motion assessment system comprising:
a plurality of polling devices within an internal cabin an aircraft, wherein the plurality of polling devices are associated with passenger seats onboard the aircraft; and
a motion assessment control unit circuit communicatively coupled to the plurality of polling devices, wherein the motion assessment control unit circuit is configured to receive passenger-input motion effects data from the plurality of polling devices,
wherein the motion assessment control unit circuit is configured to generate a motion map of the internal cabin based, at least in part, on passenger-input motion effects data received from the plurality of polling devices.

23. The aircraft motion assessment system of claim 22, wherein the motion assessment control unit is configured to identify seats on the motion map that are susceptible to increased motion effects.

24. An aircraft motion assessment system comprising:
a plurality of polling devices within an internal cabin an aircraft, wherein the plurality of polling devices are associated with passenger seats onboard the aircraft;
a motion assessment control unit circuit communicatively coupled to the plurality of polling devices, wherein the motion assessment control unit circuit is configured to receive passenger-input motion effects data from the plurality of polling devices; and
a poll triggering device configured to be engaged to cause the motion assessment control unit circuit to output a motion effects polling signal to the plurality of polling devices.

25. An aircraft motion assessment system comprising:
a plurality of polling devices within an internal cabin an aircraft, wherein the plurality of polling devices are associated with passenger seats onboard the aircraft; and
a motion assessment control unit circuit communicatively coupled to the plurality of polling devices, wherein the motion assessment control unit circuit is configured to receive passenger-input motion effects data from the plurality of polling devices,
wherein the motion assessment control unit circuit is configured to output a polling awareness signal to the plurality of polling devices, wherein the plurality of polling devices are configured to display a polling awareness message based on the motion polling awareness signal, and wherein the polling awareness message provides guidance as to the motions effects poll.

26. An aircraft motion assessment method comprising:
associating a plurality of polling devices within an internal cabin of an aircraft with passenger seats onboard the aircraft;
communicatively coupling a motion assessment control unit circuit to the plurality of polling devices;
receiving, by the motion assessment control unit circuit, passenger-input motion effects data from the plurality of polling devices; and
generating, by the motion assessment control unit circuit, a motion map of the internal cabin based, at least in part, on the passenger-input motion effects data received from the plurality of polling devices.

27. An aircraft motion assessment method comprising:
associating a plurality of polling devices within an internal cabin of an aircraft with passenger seats onboard the aircraft;
communicatively coupling a motion assessment control unit circuit to the plurality of polling devices;
receiving, by the motion assessment control unit circuit, passenger-input motion effects data from the plurality of polling devices;
outputting, by the motion assessment control unit circuit, a polling awareness signal to the plurality of polling devices; and
displaying a polling awareness message based on the motion polling awareness signal on the plurality of polling devices, wherein the polling awareness message provides guidance as to the motions effects poll.

* * * * *